Dec. 5, 1944.    G. L. GRAVESON ET AL    2,364,136
TEMPERATURE REGULATED ELECTRONIC APPARATUS
Filed Dec. 31, 1942
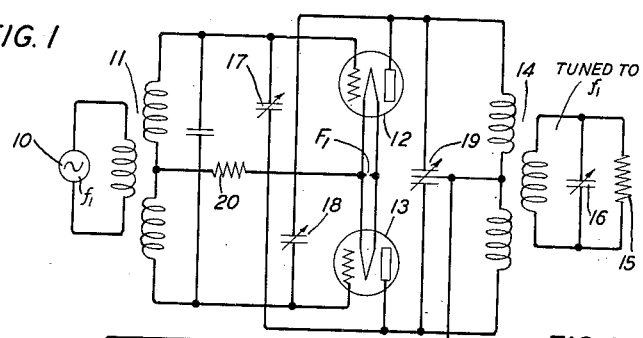
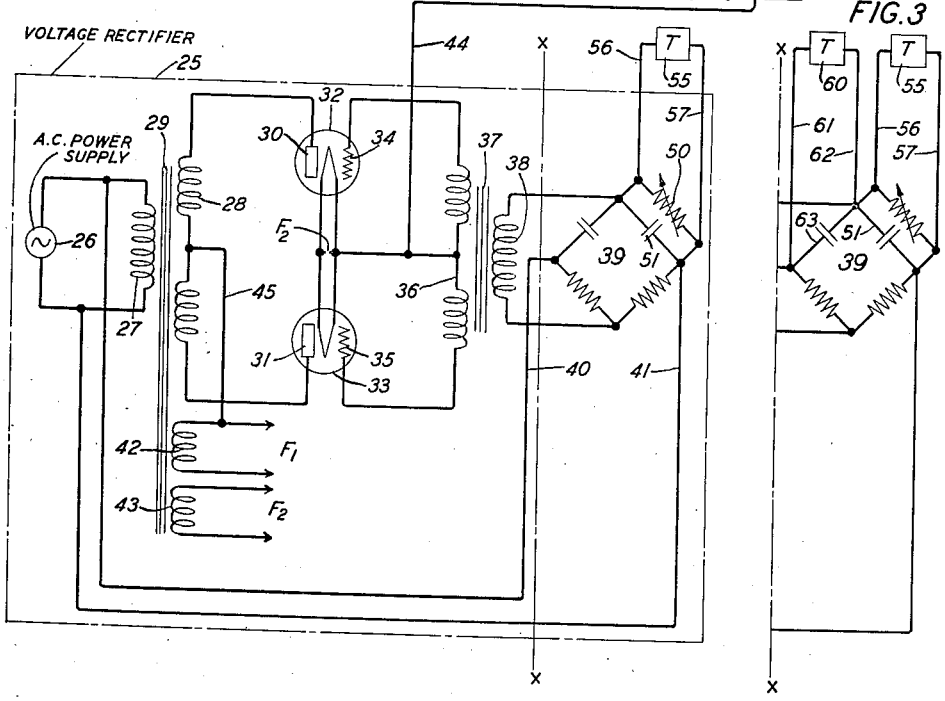
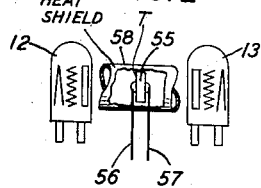
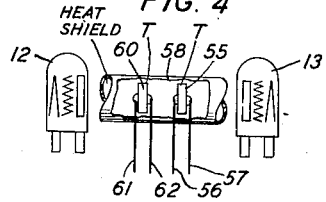
INVENTORS: G. L. GRAVESON
C. R. KEITH
BY
ATTORNEY Patented Dec. 5, 1944

2,364,136

UNITED STATES PATENT OFFICE 2,364,136

TEMPERATURE REGULATED ELECTRONIC APPARATUS

George L. Graveson, Amityville, N. Y., and Clyde R. Keith, Maplewood, N. J., assignors to Western Electric Company, Incorporated, New York, N. Y., a corporation of New York Application December 31, 1942, Serial No. 470,744

7 Claims. (Cl. 179—171)

This invention relates to electronic apparatus, and more particularly to temperature regulated electronic apparatus.

In certain circuits of the prior art, such as crystal controlled diathermy circuits, a source of alternating current of a certain individual frequency is applied to a load circuit tuned to the certain individual frequency. Usually, these circuits embody power amplifier apparatus comprising a pair of electronic devices arranged in push-pull relation such that their anodes are energized by rectified voltage supplied by suitable electronic rectifying apparatus. In the operation of the foregoing circuits, it may happen that a change in the relative positions of the diathermy electrodes would tend to detune the load circuit. In case of such happening, the amplifier devices would tend to draw an amount of anode current which would generate such amount of heat as would tend to damage the amplifier devices. The replacement of damaged electronic devices would tend to multiply unnecessarily the cost of operating the circuits; and in cases where such replacements were not readily obtainable, the circuits would be rendered useless for indeterminate periods of time thereby increasing further the cost of operating the circuits.

A high frequency power amplifier operating at high efficiency (class C) should be protected from damage to the vacuum tubes which (damage) may result from any one of several conditions, such as too-low load resistance, detuning of plate coupling, failure of excitation, and open grid bias resistor. A common form of protection is the use of a biasing resistor in the cathode circuit, but this reduces the efficiency for normal operation and does not limit the plate current sufficiently to prevent a considerable increase in heating under abnormal conditions. A relay arranged to cut off the plate voltage if the grid current falls below a predetermined minimum protects against failure of grid excitation, but not for abnormal load conditions. A relay arranged to cut off the plate voltage when the plate current exceeds a predetermined amount completely stops the circuit from operating even with a small overload. The method of protection which is the subject of this invention protects against all abnormal conditions without interrupting operation of the circuit, merely limiting the applied plate voltage to an amount which is safe for the conditions then existing.

The present invention contemplates an automatic arrangement for preventing the flow of an injurious amount of anode current in electronic apparatus.

The main object of the invention is to control the maximum amount of heat generated by the anode current flowing in electronic apparatus.

Another object is to control the rectified voltage supplied to the anodes of electronic apparatus.

A further object is to control the anode current flowing in electronic apparatus.

In the prior art circuits of the type above referred to, a source of alternating current of a certain frequency $f_1$ is applied to the input circuit of power amplifying apparatus comprising a pair of three-element electronic devices arranged in push-pull to amplify the current of the certain frequency $f_1$ such that both the input and output circuits of this apparatus are tuned to the certain frequency $f_1$. The output circuit of this amplifying apparatus is applied to a load circuit which is also tuned to the certain frequency $f_1$. The anode circuits of such amplifying electronic devices may be energized by rectified voltage supplied thereto by a pair of further three-element electronic devices operating from a commercial source of alternating current. A phase-shifting bridge controls the phase relation between the potentials applied simultaneously to the anodes and control grids of the rectifying devices whereby the magnitude of the rectified voltage supplied to the anodes of the amplifying devices is regulated.

According to a specific embodiment of the present invention, a thermoresponsive element provided with a preselected temperature coefficient of resistance is disposed intermediate the anodes of the power amplifier devices and included in one arm of the phase-shifting bridge. The temperature of the thermoresponsive element and thereby the effective resistance thereof is controlled by the heat generated by the anode current flowing in the power amplifier devices. The thermoresponsive element may be mounted in a tubular shield which tends to concentrate on the thermoresponsive element, the heat generated by such anodes, and which at the same time tends to minimize the effect of radiant heat from sources other than such anodes.

In operation, the phase-shifting bridge is initially adjusted by means of a variable resistance connected in shunt of the thermoresponsive element such that a predetermined magnitude of rectified voltage is supplied to the anodes of the power amplifier devices. The heat generated by the anode current in these devices serves to provide the thermoresponsive element with a predetermined temperature and thereby a predetermined effective resistance. This means that a certain phase relation is established between the potentials on the associated control grids and anodes of the rectifying devices. However, when the anodes of the power amplifier devices tend to be heated to a temperature in excess of the predetermined amount due, for example, to a change in the relative positions of the diathermy electrodes, these anodes tend to radiate a correspondingly increased amount of heat. This tends to increase the temperature of the thermoresponsive element and thereby to vary the effective resistance thereof. As a result, the relative impedances of the arms of the phase-shifting bridge are altered so that the phase of the potential on the control grids of the rectifying devices with respect to the phase of the potential on the associated anodes is varied in such manner as to reduce the magnitude of the rectified voltage supplied to the anodes of the power amplifier devices. This tends to cause the anode current in the power amplifier devices to be reduced thereby reducing the heat generated in the anodes thereof. As a consequence of its rapid change of resistance with temperature, the temperature of the thermoresponsive element needs to rise only a very small amount to reduce the plate voltage to a degree such that the anode heating is allowed to increase only by a correspondingly small amount. The result is that the anode temperature rises only slightly above that occurring for normal operation.

A feature of the invention is that the control of the temperature of the power amplifier devices may be substantially improved by inserting a further thermoresponsive element provided with another preselected temperature coefficient of resistance in a second arm of the phase-shifting bridge. In this feature, the two individual thermoresponsive elements are disposed adjacent each other and intermediate both power amplifier devices and simultaneously vary their effective resistances in an opposite sense.

A further feature is that additional sensitivity may be obtained by connecting one or more similar thermoresponsive elements in series and/or parallel with each of the thermoresponsive elements individual to the two arms of the phase-shifting bridge.

The invention will be readily understood from the following description taken together with the accompanying drawing, in which:

Fig. 1 is a diagrammatic circuit showing an electronic apparatus regulated from the standpoint of temperature in accordance with a specific embodiment of the invention;

Fig. 2 is a partial schematic view of the apparatus utilized in Fig. 2;

Fig. 3 is a partial diagrammatic circuit of a modification that may be embodied in Fig. 1; and Fig. 4 is a partial schematic view of the apparatus utilized in Figs. 1 and 3.

In the drawing the same reference numerals are employed to designate the same elements appearing in the several figures thereof.

Referring to Fig. 1, a source 10 of alternating current of certain frequency $f_1$ is applied through input transformer 11 to the control grids of a pair of three-element power electronic devices 12 and 13 arranged in push-pull. The anodes of both latter devices are coupled by an output transformer 14 to a load 15 tuned by the secondary winding of the latter transformer and capacitor 16 to the alternating current of the certain frequency $f_1$. The capacitors 17 and 18 neutralize the grid-to-plate capacitances of the power devices 12 and 13 so that they will not oscillate by themselves. The double capacitor 19 together with the split primary windings of the output transformer 14 serve to tune the output circuit of the push-pull devices 12 and 13 to the alternating current of the certain frequency $f_1$. In the case of diathermy apparatus, the load 15 is replaced by the usual diathermy electrodes, not shown. A resistor 20 serves to apply negative bias to the control grids of the power devices 12 and 13.

The anodes of the power devices 12 and 13 are supplied with rectified voltage from the electronic voltage rectifier 25 in a manner that will now be explained. A supply 26 of commercial alternating current is coupled by primary winding 27 and split secondary winding 28 of a transformer 29 to the anodes 30 and 31 of a pair of rectifying electronic devices 32 and 33, respectively. The control grids 34 and 35 of the latter devices are applied to split secondary winding 36 of a transformer 37 whose primary winding 38 is connected across the vertical diagonal of a phase-shifting Wheatstone bridge 39. The horizontal diagonal of this bridge is connected via leads 40 and 41 across the supply 26.

The other secondary windings 42 and 43 are understood to be connected over leads, not shown, to the filaments $F_1$ and $F_2$ of the pairs of power devices 12 and 13 and rectifying devices 32 and 33, respectively. A lead 44 connects the midpoint of the split secondary winding 36 of the transformer 37 to the midpoint of the split primary winding of the output transformer 14 and thereby to the anodes of both devices 12 and 13. A lead 45 connects the midpoint of the split secondary winding 28 of the transformer 29 to one side of the other secondary winding 42 of the latter transformer.

In the operation of Fig. 1, the source 10 supplies alternating current of certain frequency $f_1$ to the power amplifier comprising devices 12 and 13 whose output supplies amplified current of the certain frequency $f_1$ to the load circuit 15 arranged to utilize amplified current of such frequency. To activate the power devices 12 and 13 for this purpose, the rectifying devices 32 and 33, which are preferably of the gas-filled type, operate as a full-wave rectifier to supply rectified voltage to the anodes of the power devices 12 and 13. This rectified voltage is effective over a circuit comprising control grid-cathode circuits of the rectifying devices 32 and 33, lead 44, midpoint of the split primary winding of the output transformer 14, anode-cathode circuits of the power devices 12 and 13, secondary winding 42 of the transformer 29, and lead 45 connected effectively to the midpoint of the split secondary winding 28 applied to the anode circuits of the rectifying devices 32 and 33.

The magnitude of the rectified voltage supplied to the anodes of the power devices 12 and 13 by the rectifying devices 32 and 33 is determined by the phase of the potential on the control grids 34 and 35 with respect to the phase of the potential on the associated anodes 30 and 31. The phase of the potential on the control grids 34 and 35 is varied by the phase-shifting bridge 39 while the phase of the potential on the anodes 30 and 31 is fixed. The adjustable resistor 50 connected in shunt of the capacity arm 51 of the phase-shifting bridge 39 enables adjustment of the balance of the latter such that a predetermined phase relation is initially established between the potentials on the anodes 30 and 31, and control grids 34 and 35. This causes the magnitude of the rectified voltage applied to the anodes of the power devices 12 and 13 in the manner above explained to be initially set at a predetermined value.

The foregoing describes a circuit and operation, both of which are known in the prior art. However, in the operation of such circuit it may happen that the load circuit 15 tends to become detuned, for the reason hereinbefore mentioned, with respect to the current of the certain frequency $f_1$ being supplied by the output circuit of the power devices 12 and 13. As a consequence of such detuning, the power devices 12 and 13 tend to draw an increased amount of anode current which does not reach the load circuit 15 but flows only in the output circuit of the power devices 12 and 13. Such increased amount of anode current tends to generate heat in the anodes of the power devices 12 and 13 which heat, if unchecked, will tend to cause damage to the latter devices. The heat generated by such power consumption by the anodes of the power devices 12 and 13 will tend to cause their breakdown and thereby to shorten their useful life.

In accordance with the specific embodiment of the invention shown in Figs. 1 and 2, an automatic arrangement is provided for limiting the maximum amount of power which may be consumed by the anodes of the power devices 12 and 13. This is accomplished by utilizing the heat radiated by the anodes of both power devices 12 and 13 in a manner that will now be explained. A thermoresponsive element 55 provided with a preselected temperature coefficient of resistance is disposed substantially intermediate the anodes of the power devices 12 and 13, Fig. 2, and connected by leads 56 and 57 to the capacity arm 51 of the phase-shifting bridge 39. The thermoresponsive element 55 may be of the disc type disclosed in the patent of W. F. Janssen No. 2,219,365, issued October 29, 1940, and provided with a negative temperature coefficient of resistance. The thermoresponsive element 55 may be mounted in a tubular heat shield 58, Fig. 2, which tends to concentrate on the former element the heat generated by both anodes of the power devices 12 and 13, and at the same time to minimize on the thermoresponsive element 55 the effect of heat generated by sources, not shown, other than the anodes of both power devices 12 and 13.

When the anodes of the power devices 12 and 13 tend to draw an excessive amount of space current for the reason mentioned previously, the heat generated by the anodes of both power devices 12 and 13 and radiated thereby causes the thermoresponsive element 55 to increase its temperature to a corresponding extent. This causes a certain reduction in the effective resistance of the thermoresponsive element 55 and thereby a certain change in the effective impedance of the capacity arm 51 of the phase-shifting bridge 39. This causes the phase of the potential on the control grids 34 and 35 of the rectifying devices 32 and 33 to vary with respect to the phase of the potential on the anodes 30 and 31 of both latter devices. This causes the magnitude of the rectified voltage supplied to the anodes of the power devices 12 and 13 to reduce to such extent as will cause the amount of anode current flowing in both power devices 12 and 13 to reduce to a corresponding amount. As a consequence, the power consumed by the power devices 12 and 13 will be reduced to a value which precludes damage to either one or both latter devices in response to the heat generated in either one or both anodes of the power devices 12 and 13.

Thus, the thermoresponsive element 55 serves to prevent the generation of excessive heat in the anodes of both power devices 12 and 13, and thereby precludes damage to either one or both latter devices from such heat. As the temperature of the anodes of the power devices 12 and 13 is restored to a normal value, the thermoresponsive element 55 functions in an opposite sense to restore the predetermined magnitude of rectified voltage to the anodes of both power devices 12 and 13 for their normal operation. The arrangement illustrated in Figs. 1 and 2 may be further improved by connecting several of the thermoresponsive elements 55 in series and/or parallel, in order to operate in the range of resistance variation most suitable for the particular circuit.

Fig. 3 shows a modification for effecting an increase in the sensitivity of the circuit of Fig. 1. In this connection it is understood that the circuit portion shown in Fig. 3 is substituted for the circuit portion shown to the right of the line X—X in Fig. 1. Referring to Fig. 3, a thermoresponsive element 60 is also disposed intermediate the power devices 12 and 13, Fig. 4, and connected via leads 61 and 62 in shunt of capacity arm 63 of the phase-shifting bridge 39. The thermoresponsive element 60 may be of the disc type disclosed in the patent of G. L. Pearson, No. 2,258,958, issued October 14, 1941, and provided with a positive temperature coefficient of resistance. Thus, both thermoresponsive elements 55 and 60 are included within the heat shield 58, Fig. 4, so as to be subject to the same amount of heat generated by the anodes of both power devices 12 and 13 in the manner above explained. Variations in the effective resistances of both thermoresponsive elements 55 and 60 due to radiant heat from the anodes of both power devices 12 and 13 cause both capacity arms 51 and 63 of the phase-shifting bridge 39 to vary their effective impedances in an opposite sense.

Hence, the adjustment of the unbalance of the phase-shifting bridge 39 is brought about relatively quickly whereby the change in the magnitude of the rectified voltage is brought about in a similar manner. This enables a relatively quick adjustment of the amount of anode current flowing in the power devices 12 and 13 as the amount of heat generated in both latter devices approaches the permissible maximum which causes no injury to the power devices 12 and 13. This, therefore, tends to prevent the heat generated in the anodes of both power devices 12 and 13 from exceeding the permissible maximum. As in the case of the thermoresponsive element 55 in Fig. 1, the operating range of the circuit combination of Figs. 1 and 3 may be further improved by connecting several of the thermoresponsive elements 60 in series and/or parallel.

What is claimed is:

1. In combination in temperature controlled electronic apparatus comprising a load circuit, means including electronic apparatus to supply electrical energy to said load circuit such that the temperature of said electronic apparatus is caused to vary in response to the amount of electrical energy consumed therein, and means to control the energization of said electronic apparatus and thereby the amount of electrical energy consumed therein, means comprising a thermoresponsive element having a preselected temperature coefficient of resistance and disposed in proximity of said electronic apparatus to control the operation of said energizing control means in response to temperature variations of said electronic apparatus.

2. In combination in temperature controlled electronic apparatus comprising a load circuit, means including electronic apparatus to supply electrical energy to said load circuit such that the temperature of said electronic apparatus is caused to vary in response to the amount of the space current flowing therein, and means to activate said electronic apparatus for effecting the flow of space current therein including a Wheatstone bridge whose condition of unbalance determines the amount of the activation of said electronic apparatus and thereby the temperature thereof, means comprising a thermoresponsive element having a preselected temperature coefficient of resistance and included in one arm of said bridge and disposed in proximity of said electronic apparatus to vary the condition of unbalance of said bridge in response to the temperature variations of said electronic apparatus.

3. In combination in temperature regulated electronic apparatus, a load circuit, means to supply electrical energy to said load circuit including a pair of electronic devices arranged in push-pull relation, each of said devices including an anode which is subject to variations in temperature as the amount of electrical energy consumed thereby undergoes changes, means to energize said anodes, and means comprising a thermoresponsive element having a preselected temperature coefficient of resistance and disposed in proximity of said anodes to control the operation of said energizing means and thereby the amount of electrical energy consumed by said anodes as variations occur in the temperature of said anodes.

4. In combination in temperature regulated electronic apparatus comprising a load circuit, means to supply electrical energy to said load circuit including at least two electronic devices, each including an anode whose temperature varies as changes occur in the amount of electrical energy consumed thereby, and means to utilize the phase relation between two different portions of further electrical energy to activate said anodes, means comprising a thermoresponsive element having a preselected temperature coefficient of resistance and disposed in proximity of said anodes to vary the phase of one of said two different portions of said further electrical energy in response to the temperature variations of said anodes.

5. A temperature controlled electronic apparatus comprising a source of electrical waves, means comprising electronic apparatus to amplify said electrical waves such that the temperature of said electronic apparatus varies in proportion to the amount of space current flowing therein, a load circuit for said amplifying means, means to supply voltage to said electronic apparatus to activate the flow of space current therein including a Wheatstone bridge whose condition of unbalance determines the amount of activation of said electronic apparatus and thereby the temperature thereof, and means comprising a pair of thermoresponsive elements having preselected opposite temperature coefficients of resistance and individually included in one of two arms of said bridge and disposed in proximity of said electronic apparatus to vary the condition of unbalance of said bridge in response to temperature variations of said electronic apparatus.

6. A temperature regulated electronic apparatus comprising a source of electrical waves, means to amplify said electrical waves comprising one pair of electronic devices arranged in push-pull relation, each of said one pair of devices including an anode, the anodes of said one pair of devices varying in temperature in proportion to the amount of space current flowing therein, a load circuit to utilize the amplified electrical waves, and means to supply rectified voltage to the anodes of said one pair of devices to control the amount of space current flowing therein, comprising a supply of alternating voltage, a further pair of electronic devices each including a control grid and an anode, said further devices being connected such that their anodes and control grids are applied to said supply, and a bridge interposed between said supply and the control grids of said further pair of devices to vary the phase of the portion of voltage supply impressed thereon whereby the magnitude of the rectified voltage is varied, and means comprising a thermoresponsive element having a preselected temperature coefficient of resistance and included in one arm of said bridge and disposed in proximity to the anodes of said one pair of devices to vary the phase of the portion of the voltage supply impressed on said control grids whereby the magnitude of the rectified voltage supplied to said anodes of said one pair of devices is varied in response to the temperature variations of said anodes of said one pair of devices.

7. A temperature regulated electronic apparatus comprising a source of electrical waves, a load circuit, means comprising a pair of electronic devices to amplify the electrical waves and to supply them to said load circuit, each of said amplifying devices including an anode, said anodes of said amplifying devices varying their temperature as changes occur in the amount of space current flowing in said latter devices, means to supply rectified voltage to said anodes of said amplifying devices to control the amount of space current flowing therein, comprising a supply of alternating voltage, a pair of further electronic devices, each including a control grid and an anode arranged such that their anodes and control grids are connected to said supply, a bridge interposed between said supply and said control grids of said further devices to vary the phase of the portion of the supply voltage applied thereto whereby the magnitude of the rectified voltage is controlled, and means comprising a pair of thermoresponsive elements having preselected opposite temperature coefficients of resistance and included individually in one arm of said bridge and disposed in proximity of said anodes of said amplifying devices to vary the phase of the portion of the voltage supplied to said control grids whereby the magnitude of rectified voltage supplied to said anodes of said amplifying devices is varied in response to temperature variations of said anodes of said amplifying devices.

GEORGE L. GRAVESON.
CLYDE R. KEITH.